(12) United States Patent
Engh-Halstvedt et al.

(10) Patent No.: US 12,346,255 B2
(45) Date of Patent: Jul. 1, 2025

(54) PROVIDING COUNTERS IN A DATA PROCESSOR

(71) Applicant: Arm Limited, Cambridge (GB)

(72) Inventors: Andreas Due Engh-Halstvedt, Trondheim (NO); Philip Michael Watts, Cambridge (GB)

(73) Assignee: Arm Limited, Cambridge (GB)

( * ) Notice: Subject to any disclaimer, the term of this patent is extended or adjusted under 35 U.S.C. 154(b) by 128 days.

(21) Appl. No.: 18/188,147

(22) Filed: Mar. 22, 2023

(65) Prior Publication Data

US 2023/0305963 A1   Sep. 28, 2023

(30) Foreign Application Priority Data

Mar. 28, 2022   (GB) .................................. 2204373.1

(51) Int. Cl.
*G06F 12/0837* (2016.01)
*G06F 12/122* (2016.01)

(52) U.S. Cl.
CPC ........ *G06F 12/0837* (2013.01); *G06F 12/122* (2013.01)

(58) Field of Classification Search
CPC ............... G06F 12/0837; G06F 12/122; G06F 12/0857; G06F 2212/1024; G06F 2212/455; G06F 2212/502; G06F 12/0804; G06F 12/126; G06F 9/52; G06F 12/0895; G06F 2212/1008; G06F 9/3867; G06F 9/3838; G06F 11/3409
See application file for complete search history.

(56) References Cited

U.S. PATENT DOCUMENTS

| | | | |
|---|---|---|---|
| 2011/0055489 A1* | 3/2011 | Reddy ................ | G06F 12/0831 711/E12.017 |
| 2013/0076762 A1 | 3/2013 | Heggelund et al. | |
| 2014/0059329 A1 | 2/2014 | Alexander et al. | |
| 2021/0263826 A1* | 8/2021 | Rosemarine ........ | G06F 11/3409 |
| 2023/0297485 A1* | 9/2023 | Vaidya ..................... | G06F 1/10 702/186 |

FOREIGN PATENT DOCUMENTS

EP   3553738   10/2019

OTHER PUBLICATIONS

Combined Search and Examination Report dated Aug. 15, 2022, GB Patent Application No. GB2204373.1.

* cited by examiner

*Primary Examiner* — Michael Krofcheck
(74) *Attorney, Agent, or Firm* — Pearl Cohen Zedek Latzer Baratz LLP

(57) ABSTRACT

A data processor, such as a graphics processor, is disclosed. The data processor includes a set of one or more counters, and a control circuit that maintains a cache-like pool of corresponding entries. In response to a request for a counter, the control circuit may allocate an entry of the cache-like pool to thereby allocate a counter of the set.

18 Claims, 7 Drawing Sheets

PROVIDING COUNTERS IN A DATA PROCESSOR

CROSS-REFERENCE TO RELATED APPLICATIONS

This application claims priority pursuant to 35 U.S.C. 119(a) to British Application No. 2204373.1, filed Mar. 28, 2022, which application is incorporated herein by reference in its entirety.

BACKGROUND

The technology described herein relates to data processors and data processing systems, such as graphics processors and graphics processing systems, and in particular to the provision of performance counters in such processors and systems.

Performance counters are commonly used in data processors and data processing systems. For example, graphics APIs often support the counting of various statistics, such as counting occlusion queries and counting pipeline statistics, such as a number of vertex, fragment or compute execution threads.

The Applicants believe that there remains scope for improvements to the provision of performance counters in data processors and data processing systems, such as graphics processors and graphics processing systems.

BRIEF DESCRIPTION OF THE DRAWINGS

Embodiments of the technology described herein will now be described by way of example only and with reference to the accompanying drawings, in which.

Like reference numerals are used for like components where appropriate in the drawings.

DETAILED DESCRIPTION

Figures 1, 2:
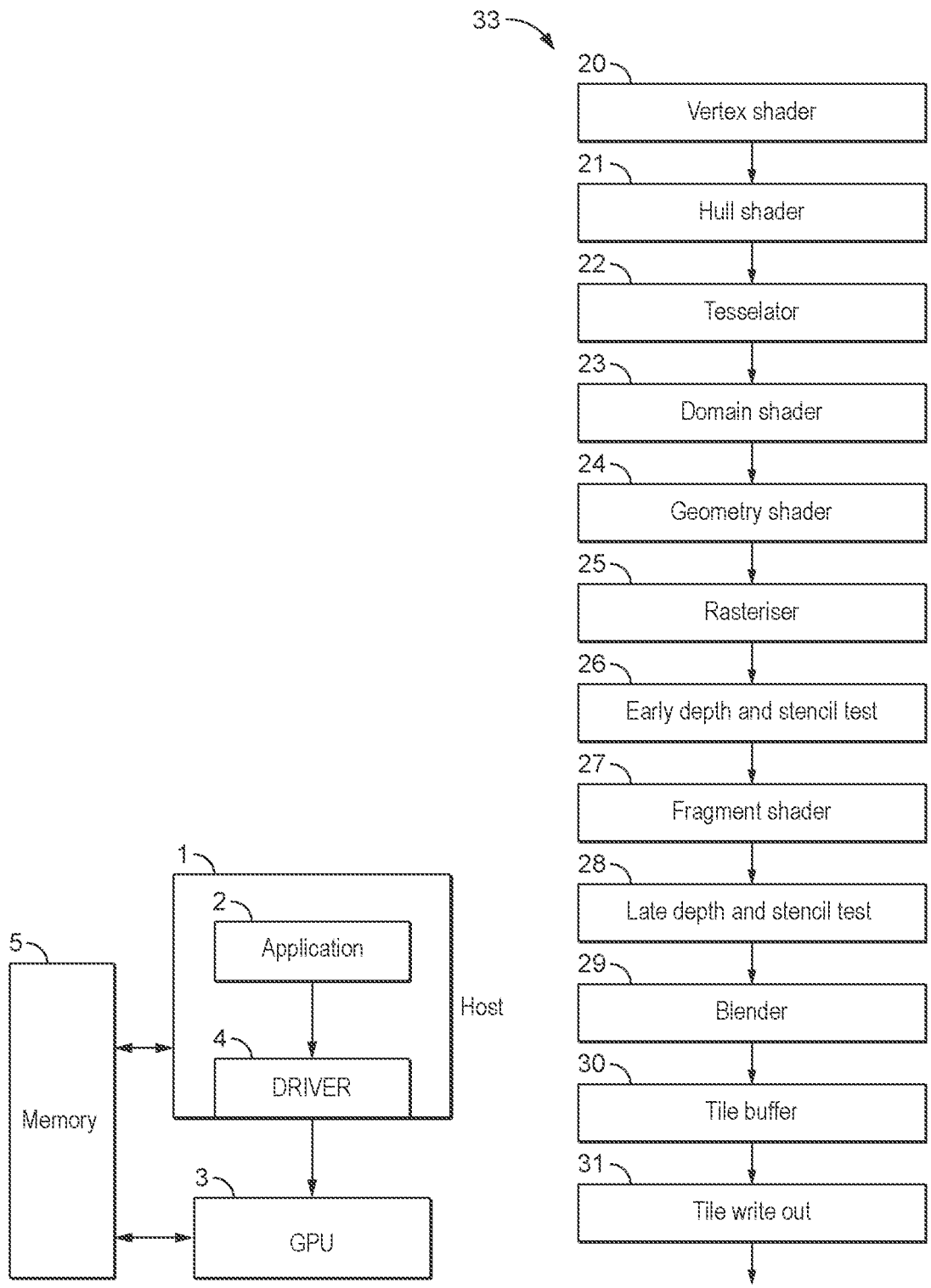
FIG. 1 illustrates a graphics processing system that may be operated in accordance with embodiments of the technology described herein.
FIG. 2 illustrates a graphics processing pipeline that may be executed by a graphics processor in embodiments of the technology described herein.

A first embodiment of the technology described herein comprises a data processor comprising: a set of one or more counters; and a control circuit configured to: maintain a pool of one or more entries, wherein each entry of the pool is associated with a respective counter of the set of one or more counters, and includes an identifier associated with the respective counter; and to: in response to a request for a counter of the set of one or more counters: determine whether the pool of one or more entries includes an entry that includes an identifier that matches the request for a counter.

A second embodiment of the technology described herein comprises a method of operating a data processor that comprises a set of one or more counters, the method comprising: maintaining a pool of one or more entries, wherein each entry in the pool is associated with a respective counter of the set of one or more counters, and includes an identifier associated with the respective counter; and in response to a request for a counter of the set of one or more counters: determining whether the pool of one or more entries includes an entry that includes an identifier that matches the request for a counter.

The technology described herein relates to the provision of counters in a data processor, such as a graphics processor. In embodiments, a set of one or more local counters (e.g., and in embodiments, registers) is provided for use by the processor, with each counter in the set being associated with a respective entry of a "cache-like" pool of one or more entries. Each entry in the "cache-like" pool includes a "cache tag-like" identifier, against which a request for a counter can be compared in a "cache tag check-like" matching operation, e.g. and in embodiments, to determine whether the request relates to an already allocated (assigned) counter, or whether the request should trigger a new allocation (assignment) of one of the counters.

As will be discussed below, the "cache tag-like" identifier can also be, and in embodiments is, used to indicate the memory location (address) at which a result of counting using the associated counter should be output. Thus, in embodiments, a "cache eviction-like" operation outputs a count value of a counter to a memory location (address) indicated by the corresponding "cache tag-like" identifier.

As will be discussed in more detail below, the inventors have found that arranging counters in a "cache-like" pool in this manner, can facilitate particularly convenient and efficient counter provision. In particular, the inventors have recognised that while it would be possible to include in a data processor a separate counter for each possible required counting task, it may typically be the case that not all such counters will be required to be in use at the same time. As will be discussed below, the technology described herein can allow counters to be allocated "dynamically" in use, and thereby facilitate a reduction in the overall number of counters that would otherwise be required. Furthermore, and as will be discussed below, embodiments of the technology described herein can facilitate a reduction in the size of each counter that would otherwise be required.

It will be appreciated, therefore, that the technology described herein can provide an improved data processor and data processing system.

An (and in embodiments each) identifier can comprise any suitable information that can identify the corresponding entry. In embodiments, an (each) identifier is analogous to a "tag" of a conventional data cache.

Thus, in embodiments an (each) identifier indicates a memory location (address), in embodiments at which a result of counting using the associated counter should be output. An (each) identifier (e.g. "tag") may, for example, comprise some or all of a physical memory address.

It can be determined whether an identifier matches a request for a counter in any suitable and desired manner. In embodiments, a matching operation analogous to a "tag check" operation of a conventional data cache is performed.

Thus, in embodiments, the identifier of an (each) entry of the pool can (and in embodiments does) indicate a memory address, the request for a counter indicates a memory address, and it is determined whether the pool of one or more entries includes an entry that includes an identifier that matches the request for a counter by determining whether the pool of one or more entries includes an entry that includes an identifier that indicates the memory address indicated by the request for a counter. (In embodiments, it is determined that the pool includes a matching entry when an (valid) entry has an identifier that indicates the same memory address as the request, and it is determined that the pool does not include a matching entry when there is no (valid) entry having an identifier that indicates the same memory address as the request.)

Whether a matching entry is found or not can trigger any suitable and appropriate response. In embodiments, a lack of a matching entry triggers a new allocation of an entry (and corresponding counter), in an analogous fashion to conventional data cache operation.

Thus, in embodiments, when it is not determined that the pool of one or more entries includes an entry that includes an identifier that matches the request for a counter (when it is determined that the pool of one or more entries does not include an entry that includes an identifier that matches the request for a counter), an entry of the pool of one or more entries is (newly) allocated. In embodiments, when it is determined that the pool of one or more entries includes an entry that includes an identifier that matches the request for a counter, (newly) allocating an entry of the pool is not (is other than) performed.

Thus, according to an embodiment of the technology described herein, there is provided a data processor comprising: a set of one or more counters; and a control circuit configured to: maintain a pool of one or more entries, wherein each entry in the pool is associated with a respective counter of the set of one or more counters, and includes an identifier that can indicate a memory address associated with the respective counter; and to: in response to a request for a counter of the set of one or more counters, the request for a counter indicating an associated memory address: determine whether the pool of one or more entries includes an entry that includes an identifier that indicates the memory address indicated by the request for a counter; and allocate an entry of the pool of one or more entries when it is not determined that the pool of one or more entries includes an entry that includes an identifier that indicates the memory address indicated by the request for a counter.

According to an embodiment of the technology described herein, there is provided a method of operating a data processor that comprises a set of one or more counters, the method comprising: maintaining a pool of one or more entries, wherein each entry in the pool is associated with a respective counter of the set of one or more counters, and includes an identifier that can indicate a memory address associated with the respective counter; and in response to a request for a counter of the set of one or more counters, the request indicating an associated memory address: determining whether the pool of one or more entries includes an entry that includes an identifier that indicates the memory address indicated by the request for a counter; and allocating an entry of the pool of one or more entries when it is not determined that the pool of one or more entries includes an entry that includes an identifier that indicates the memory address indicated by the request for a counter.

As discussed above, embodiments of technology described herein relate to the provision of counters in a data processor, such as a graphics processor. In embodiments, a set of one or more local counters (e.g., and in embodiments, registers) is provided for use by the processor, with each counter in the set being allocatable (assignable) via a "cache-like" pool of one or more entries. Each entry in the "cache-like" pool is in embodiments associated with a respective one of the one or more counters, and includes a "cache tag-like" identifier, against which a request for a counter can be compared in a "cache tag check-like" operation to determine whether the request relates to an already allocated (assigned) counter, or whether the request should trigger a new allocation (assignment) of one of the counters.

Thus, in embodiments, when it is not determined that the pool of one or more entries includes an entry that includes an identifier that indicates the memory address indicated by the request for a counter (when it is determined that the pool of one or more entries does not include an entry that includes an identifier that indicates the memory address indicated by the request for a counter), (newly) allocating an entry of the pool of one or more entries is performed, in embodiments by updating the identifier of the (newly) allocated entry to indicate the memory address indicated by the request for a counter; whereas when it is determined that the pool of one or more entries includes an entry that includes an identifier that indicates the memory address indicated by the request for a counter, (newly) allocating an entry of the pool of one or more entries is not (is other than) performed.

The data processor can comprise any suitable and desired processor, such as a central processing unit (CPU). The data processor is in embodiments a graphics processor (GPU).

The data processor may be a single or multi-cored data processor. Thus, the (e.g. graphics) processor in embodiments comprises one or more, such as plural, (programmable) execution units (e.g. shader cores), that may each be operable to execute (e.g. shader) programs. In embodiments, the (e.g. graphics) processor comprises a (job) managing circuit operable to distribute processing tasks to the, e.g. plural, (programmable) execution units.

An (programmable) execution unit (e.g. shader core) can be arranged in any suitable manner. In embodiments, an (and in embodiments each) (programmable) execution unit includes at least an execution thread issuing circuit operable to issue execution threads for execution (in response to tasks received from the (job) managing circuit), and an execution thread executing circuit (execution engine) operable to execute execution threads issued by the execution thread issuing circuit.

The execution thread issuing circuit may, for example and in embodiments, comprise a task receiving circuit (endpoint) and an execution thread generating circuit, wherein the task receiving circuit receives tasks from the (job) managing circuit and, in response, causes the execution thread generating circuit to generate execution threads for execution by the execution thread executing circuit. The execution thread generating circuit could generate threads separately for execution, but in embodiments generates groups of plural execution threads (which may be referred to as "warps") for execution, wherein the threads of one group ("warp") are executed in lockstep, e.g. one instruction at a time, by the execution thread executing circuit. Other arrangements would be possible.

In the technology described herein, the data processor includes a set of one or more counters and a control circuit that maintains a pool of one or more corresponding entries. The one or more counters and the pool maintaining control circuit may comprise separate circuits, or may be at least partially formed of shared processing circuits. In embodiments, an (programmable) execution unit of the data processor includes the set of one or more counters and the control circuit. Thus, the one or more counters are in embodiments local to an (programmable) execution unit.

Where the data processor includes plural (programmable) execution units, each (programmable) execution unit of the data processor in embodiments includes a respective set of one or more (local) counters and corresponding pool maintaining control circuit. Thus, in embodiments, the data processor includes plural sets of one or more counters, and plural corresponding (respective) pool maintaining control circuits. In this case, each such set of one or more counters and corresponding control circuit in embodiments operates in the manner of the technology described herein as described herein.

In embodiments of the technology described herein, a memory address can be indicated by a request for a counter, and by an identifier of a pool entry. The data processor should thus be, and in embodiments is, in communication with a suitable memory. The memory can comprise any suitable memory, and may be configured in any suitable and desired manner. In embodiments, it is a main memory of a data processing system that the data processor is part of. In embodiments, it is a memory that is off chip from the data processor, i.e. an external (main) memory (external to the data processor).

Thus, embodiments of the technology described herein relate to a data processing system, such as a graphics processing system, that comprises the data processor and a memory (a memory address of which can be indicated by a request for a counter, and can be indicated by an identifier of an entry of the pool).

The data processor may communicate with the memory in any suitable and desired manner. In embodiments, the data processor further comprises a cache system via which it can communicate with the memory.

The cache system can be arranged in any suitable manner. The cache system may be a single level cache system, but in embodiments is a multi-level cache system. In embodiments, the cache system includes, for an (and in embodiments each) (programmable) execution unit of the data processor, a respective lower level cache (i.e. a cache that is (logically) closer to the data processor) that the respective (programmable) execution unit has (direct) access to, such as and in embodiments, a load/store cache. The cache system in embodiments further comprises a shared, higher level cache (i.e. a cache that is (logically) closer to the memory) that each of the lower level caches (and thus (programmable) execution units) are in communication with.

For example, and in embodiments, the cache system includes one or more level 1 (L1) caches, and a level 2 (L2) cache (logically) in between the memory system and the one or more L1 caches. Other levels of the cache system would be possible. For example, the cache system could comprise a level 0 (L0) and/or level 3 (L3) cache.

A (each) counter of a (the) set of one or more counters can be any suitable and desired counter that can be used for (performance) counting purposes. A counter should comprise suitable storage for storing a count value, e.g. and in embodiments, an (unsigned) integer value. In embodiments, a (and in embodiments each) counter comprises a register.

A (the) set of one or more counters may comprise counters (registers) of different sizes, but in embodiments each counter (register) in a set of one or more counters is the same size. The size (bit width) of a (and in embodiments each) counter (register) may, for example, be 8 bits, 16 bits, 20 bits, 32 bits, 64 bits, etc.

In the technology described herein, a pool of one or more entries is maintained (by a (the) control circuit). A (the) pool of one or more entries should be, and in embodiments is, a "cache-like" data structure. That is, a pool is in embodiments operable in an analogous manner to a conventional data cache, but rather than each cache entry (e.g. cache line) caching data fetched from memory (as would be the case for a conventional data cache), each entry of the pool is associated with (and in embodiments includes) a respective counter of a set of one or more counters.

Correspondingly, rather than each cache entry (e.g. cache line) including an identifier (e.g. tag) that can indicate an address in memory at which data cached by the entry is stored in memory (as would be the case for a conventional data cache), each entry of a pool includes an identifier (tag) that in embodiments can indicate a memory address (location) associated with the respective counter. In particular embodiments, as will be described below, an (each) identifier (tag) indicates an address (location) in memory at which a result of counting using the respective counter should be output.

Correspondingly, (analogously to a conventional data cache) a (and in embodiments each) entry of a pool should, and in embodiments does, further include state information that can indicate a status of the entry, such as, and in embodiments, whether the entry is valid or invalid.

Thus, in embodiments, in response to a request for a counter, it is determined (by the control circuit) whether the pool of one or more entries includes a valid entry (an entry that includes state information that indicates that the entry is valid) that includes a matching identifier (that indicates the memory address indicated by the request for a counter). An entry of the pool of one or more entries is then (newly) allocated when it is not determined that the pool of one or more entries includes a valid entry that includes a matching identifier (that indicates the memory address indicated by the request for a counter) (when it is determined that the pool does not include a valid entry that includes a matching identifier (that indicates the memory address indicated by the request for a counter)). On the other hand, in embodiments, when it is determined that the pool of one or more entries includes a valid entry that includes a matching identifier (that indicates the memory address indicated by the request for a counter), (newly) allocating an entry is not (is other than) performed.

A request for a counter in embodiments indicates an associated memory address (location), but can otherwise take any suitable form. A request for a counter can be issued (to the control circuit) by any suitable element of the data processor, and for any suitable purposes. In embodiments, a (the) execution thread issuing circuit and/or task receiving circuit and/or execution thread generating circuit is operable to issue requests for a counter (to the control circuit). In embodiments, a request for a counter is issued for statistics purposes, such as for counting occlusion queries or a number of execution threads. Other counting tasks would be possible.

In embodiments, there are plural different (types of) requesters that the control circuit can handle requests for a counter from. For example, and in embodiments, a (and in embodiments each) execution unit (e.g. shader core) is operable to execute plural different types of (e.g. shader) program that may each require (and issue requests for) a counter. Thus, for example and in embodiments, a (the) task receiving circuit is operable as plural different endpoint types that can issue requests for a counter, such as, in the case of graphics processing, one or more, or all, of: a compute processing endpoint, a fragment processing endpoint, and a geometry (vertex) processing endpoint. Other arrangements are possible.

Requests from different (types of) requesters (e.g. endpoints) can be handled in any suitable and desired manner. In embodiments, each entry of the pool of one or more entries (further) includes information that can identify a requester that requested the respective counter. In embodiments, the requester-identifying information of an entry of the pool is updated (by the control circuit) to identify the requester that requested the counter when the entry is (newly) allocated. This can then facilitate keeping track of which (type of) requester requested (e.g. and is using) which counter.

Thus, according to an embodiment of the technology described herein, there is provided a data processor comprising: a set of one or more counters; and a control circuit configured to: maintain a pool of one or more entries, wherein each entry of the pool is associated with a respective counter of the set of one or more counters, and includes an identifier associated with the respective counter, and information that can identify a requester that requested the respective counter; and to: in response to a requester (of plural (types of) requesters) requesting a counter of the set of one or more counters: determine whether the pool of one or more entries includes an entry that includes an identifier that matches the request for a counter; and when it is not determined that the pool of one or more entries includes an entry that includes an identifier that matches the request for a counter, allocate an entry of the pool of one or more entries, and update the information of the allocated entry to identify the requester that requested the counter.

According to an embodiment of the technology described herein, there is provided a method of operating a data processor that comprises a set of one or more counters, the method comprising: maintaining a pool of one or more entries, wherein each entry in the pool is associated with a respective counter of the set of one or more counters, and includes an identifier associated with the respective counter, and information that can identify a requester that requested the respective counter; and in response to a requester (of plural (types of) requesters) requesting a counter of the set of one or more counters: determining whether the pool of one or more entries includes an entry that includes an identifier that matches the request for a counter; and when it is not determined that the pool of one or more entries includes an entry that includes an identifier that matches the request for a counter, allocate an entry of the pool of one or more entries, and update the information of the allocated entry to identify the requester that requested the counter.

The requester-identifying information can comprise any suitable information that can be used to distinguish one requester from another, such as an appropriate set of bits, etc. The requester-identifying information can be used in any suitable and desired manner, and for any suitable and desired purpose, such as to determine which requester a counter was requested by. In embodiments, the requester-identifying information is used (by the data processor) to determine whether a requester (of plural (types of) requesters) is (currently) using a counter of the one or more counters. For example, the information may be used to determine whether counting for a requester (e.g. endpoint) has been completed.

A request for a counter could indicate a value that is to be counted, with the request then triggering a counter to be incremented by the indicated value. Thus, a request for a counter could include a request for counting using the counter. However, in embodiments, requests for a counter and requests for counting are handled separately. This can be done in any suitable and desired manner.

In embodiments, a request for a counter returns an indication of an entry of the pool corresponding to a counter. A subsequent request for counting then includes an indication of an entry returned by a request for a counter, and in response to such a request for counting, the counter corresponding to the indicated entry is used (incremented).

Thus, in embodiments, when it is not determined (by the control circuit) that a (the) pool of one or more entries includes a matching (valid) entry (an entry that includes an identifier that indicates a memory address indicated by a request for a counter), an entry of the pool is (newly) allocated, and an indication of the (newly) allocated entry is returned (to the requester) (by the control circuit). On the other hand, in embodiments, when it is determined (by the control circuit) that a (the) pool of one or more entries includes a matching (valid) entry (that includes an identifier that indicates a memory address indicated by a request for a counter), an indication of the (already allocated) matching entry (that includes the identifier that indicates the memory address indicated by the request for a counter) is returned (to the requester) (by the control circuit).

In embodiments, in response to a request for counting that indicates an entry of a (the) pool, the requested counting is performed using the counter that the indicated entry is associated with. Thus, in embodiments, in response to a request for counting that indicates a value to be counted and an entry of a pool, the counter that the indicated entry is associated with is incremented by the indicated value (by the control circuit).

An indication of a pool entry can take any suitable form. In embodiments, each entry of a (the) pool is associated with a respective index, and an indication of an entry of a (the) pool comprises the index associated with the entry. Indicating an index value in this manner can reduce an overall bandwidth usage associated with counter and/or counting requests and/or responses, e.g. as compared to requests and/or responses indicating a memory address.

It would be possible for a counter to be usable by only one processing task or context at a time. However, the inventors have recognised that it can be the case that multiple different processing tasks or contexts should contribute to the same count. For example, in the case of tile-based graphics processing, it can be the case that the same draw call will touch multiple different rendering tiles, such that contributions to a count value for the draw call may originate from the processing of multiple different rendering tiles.

In embodiments, to facilitate this, each entry of a (the) pool of one or more entries further includes reference information that can indicate whether or not the respective counter is (currently) in use.

Reference information can take any suitable form. In embodiments, the reference information comprises a reference count. Thus, in embodiments, each entry of a (the) pool of one or more entries includes (reference information indicating) a respective reference count.

In embodiments, a reference count of a pool entry is initialised (by the control circuit) at an initial value (e.g.

zero), is incremented (by the control circuit) in response to a (the) request for a counter (for a processing task or context), and is decremented (by the control circuit) in response to an indication that counting (for a processing task or context) using the respective counter is complete.

An indication that counting (for a processing task or context) using a counter is complete can be issued (to the control circuit) by any suitable element of the data processor. In embodiments, a (the) execution thread issuing circuit and/or task receiving circuit and/or execution thread generating circuit is operable to issue an indication that counting (for a processing task or context) using a counter is complete (to the control circuit).

In embodiments, when the reference information of an entry indicates that the respective counter is no longer in use (e.g., and in embodiments, when the reference count returns to the initial value, e.g. zero), the count value of the respective counter is output to memory.

This output operation can be performed in any suitable manner. In embodiments, it is performed in an analogous manner to an eviction operation of a conventional data cache. Thus, in embodiments, a count value of a counter is output to the memory address (location) indicated by the identifier (tag) of the associated pool entry. In embodiments, (analogously to an eviction operation of a conventional data cache) the output operation comprises deallocating the associated pool entry, in embodiments by updating state information of the entry to indicate that the entry is invalid.

In embodiments, (in contrast to an eviction operation of a conventional data cache) the output ("eviction") operation adds an output count value to a count value stored at the memory address. Thus, the output ("eviction") operation in embodiments comprises reading the memory location indicated by the identifier (tag), performing an addition operation between the read memory value and the output counter value, and then writing the result of the addition operation back to the same memory location (address).

In embodiments, to facilitate multiple sources (e.g. (programmable) execution units) contributing to the same count value in memory, the output ("eviction") operation comprises an atomic addition operation.

It will be appreciated that an "atomic" memory operation is an operation sequence that reads a memory location, performs an arithmetic operation between the memory value and an operand value (typically a register value), and then writes the result of the arithmetic operation back to the same memory location. This sequence of operations is carried out so that to every observer, it looks as if the sequence has either not been performed at all, or been performed in its entirety. It is executed as one indivisible unit, hence the name "atomic". If multiple atomics are performed on the same memory location, they are serialized. This is necessary to maintain the observable semantic that each of them has been performed either in full or not at all.

In embodiments, once a count value has been "evicted" to memory (and the corresponding entry has been deallocated), the e.g. control circuit signals, e.g. to software, that the "eviction" operation has been completed (and the entry has been deallocated), e.g. so as to indicate that the count value in memory is now safe to read (is valid).

In embodiments, a count value can (in embodiments also) be output to memory so as to avoid overflow of the counter. This "flushing" operation can facilitate a reduction in the size of each counter that would otherwise be required.

Thus, in embodiments, a bit width of count values stored in memory is greater than a bit width (size) of each of the counters (registers). For example, count values may be stored in memory as 64-bit values, and each counter (register) may be smaller than 64-bits, such as 8 bits, 16 bits, 20 bits, 32 bits, etc.

An output "flushing" operation can be triggered and performed in any suitable and desired manner.

In embodiments, a count value of a counter is output (to the memory address indicated by the identifier of the associated pool entry) in response to the count value reaching a threshold value. The threshold value can be set appropriately to reduce or avoid the chance of overflow. In embodiments, the threshold value corresponds to the most significant bit (MSB) of the counter (register) becoming one.

In embodiments, the output "flushing" operation adds an output count value to a count value stored at the memory address (e.g. as discussed above). In embodiments, the output "flushing" operation comprises an atomic addition operation (e.g. as discussed above).

An output "flushing" operation could comprise deallocating the associated pool entry (e.g. as discussed above for "eviction" operation). However, in embodiments, an output "flushing" operation does not comprise deallocating the associated pool entry. Thus, in embodiments, a pool entry remains valid following a "flushing" operation being triggered. This can avoid, e.g., an output "flushing" operation causing an undesired processing delay. In this case, in embodiments, a fail-safe mechanism is used to avoid the possibility of overflow, which in embodiments comprises stalling the data processor in response to a count value of a counter reaching a second, higher threshold value. Other arrangements would be possible.

The technology described herein can be implemented in any suitable system, such as a suitably configured microprocessor based system. In embodiments, the technology described herein is implemented in a computer and/or micro-processor based system. The technology described herein is in embodiments implemented in a portable device, such as, and in embodiments, a mobile phone or tablet.

The technology described herein is applicable to any suitable form or configuration of processor and data processing system, such as graphics processors (and systems) having a "pipelined" arrangement (in which case the graphics processor comprises a rendering pipeline). It may be applicable, for example, to tile-based graphics processors and graphics processing systems. Thus the processor may be a tile-based graphics processor.

In embodiments, the various functions of the technology described herein are carried out on a single data processing platform that generates and outputs data, for example for a display device.

As will be appreciated by those skilled in the art, the data (e.g. graphics) processing system may include, e.g., and in embodiments, a host processor that, e.g., executes applications that require processing by the data (e.g. graphics) processor. The host processor will send appropriate commands and data to the data (e.g. graphics) processor to control it to perform data (e.g. graphics) processing operations and to produce data (e.g. graphics) processing output required by applications executing on the host processor. To facilitate this, the host processor should, and in embodiments does, also execute a driver for the processor and optionally a compiler or compilers for compiling (e.g. shader) programs to be executed by (e.g. an (programmable) execution unit of) the processor.

The processor may also comprise, and/or be in communication with, one or more memories and/or memory devices that store the data described herein, and/or store software (e.g. (shader) program) for performing the processes described herein. The processor may also be in communication with a host microprocessor, and/or with a display for displaying images based on data generated by the processor.

The technology described herein can be used for all forms of input and/or output that a data (e.g. graphics) processor may use or generate. For example, the data (e.g. graphics) processor may execute a graphics processing pipeline that generates frames for display, render-to-texture outputs, etc. The output data values from the processing are in embodiments exported to external, e.g. main, memory, for storage and use, such as to a frame buffer for a display.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the data processing system can otherwise include any one or more or all of the usual functional units, etc., that such components include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a data processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described. These embodiments will be described with specific reference to the use of the technology described herein in a graphics processor, but as discussed above, the technology described herein is equally applicable to other forms of data processor.

As discussed above, in embodiments of the technology described herein a data processor includes a set of one or more counters, and a control circuit that maintains a cache-like pool of corresponding entries. In response to a request for a counter, the control circuit may allocate an entry of the cache-like pool to thereby allocate a counter of the set.

FIG. 1 shows a typical computer graphics processing system, comprising a host processor (CPU) 1, a graphics processing unit (GPU) 3, and a memory 5 for storing data required by and/or generated by the host processor 1 and graphics processor 3.

When an application 2 that is executing on the host processor 1 requires graphics processing from the graphics processor 3, such as a frame to be displayed, the application 2 will generate API (Application Programming Interface) calls that are interpreted by a driver 4 for the graphics processor 3 that is running on the host processor 1 to generate appropriate commands to the graphics processor 3 to generate graphics output required by the application 2. The driver 4 can send commands and data to the graphics processor 3 by writing to the memory 5.

The commands sent to the graphics processor 3 cause the graphics processor 3 to generate the required render output. The completed render output (e.g. frame) may be written in a frame buffer in the memory 5, from where it may be provided for display on a display device, such as a screen or printer.

FIG. 2 shows a graphics processing pipeline 33 that may be executed by the graphics processor 3. The graphics processing pipeline 33 shown in FIG. 2 is a tile-based renderer and will thus produce tiles of a render output data array, such as an output frame to be generated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 33 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuit(s) and/or processing logic, etc., for performing the necessary operation and functions.

As shown in FIG. 2, the graphics processing pipeline 33 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 33. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 33.

A tiler stage (not shown) may prepare lists of the primitives to be processed for different regions of the render output. These "primitive lists" (which can also be referred to as a "tile list" or "polygon list") identify (e.g. by reference to a primitive indicator) the primitives to be processed for the region in question. The regions of the render output that primitive lists can be prepared for can correspond e.g. to single rendering tiles, or to sets of plural rendering tiles.

The rasterisation stage 25 of the graphics processing pipeline 33 operates to rasterise the primitives making up the render output (e.g. the image to be displayed) into individual graphics fragments for processing. To do this, the rasteriser 25 receives graphics primitives for rendering a rendering tile in question, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer in memory 5 for display. The depth value for an output fragment is also written appropriately to a Z-buffer within the tile buffer 30.

The tile buffer stores colour and depth buffers that store an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used). The tile buffer is provided as part of RAM that is located on (local to) the graphics processor 3 (chip).

The data from the tile buffer 30 is input to a downsampling (multisample resolve) write out unit 31, and thence output (written back) to an external memory 5 output buffer, such as a frame buffer of a display device. The display device could comprise, e.g., a display comprising an array of pixels, such as a computer monitor or a printer.

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to main memory 5 (e.g. to a frame buffer in main memory 5) for storage, the next tile is then processed, and so on, until sufficient tiles have been processed to generate the entire render output (e.g. frame (image) to be displayed). The process is then repeated for the next render output (e.g. frame) and so on.

As can be seen from FIG. 2, the graphics processing pipeline 33 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 33. This may include the creation of one or more intermediate representations of the program within the compiler. The compiler may, e.g., be part of the driver 4, with there being a special API call to cause the compiler to run. The compiler execution can thus be seen as being part of the draw call preparation done by the driver in response to API calls generated by an application. (Other compiler arrangements would be possible.)

Each shader in the graphics processing pipeline is a processing stage that performs graphics processing by running small programs for each "work item" in an output to be generated (an "item" in this regard is usually a vertex, primitive, fragment or a sampling position). For each work item to be processed, an execution thread that will execute the corresponding shader program is issued to an appropriate shader core (programmable execution unit) that then executes the shader program for the execution thread in question.

It is also known to use the shader functionality of graphics processors and graphics processing pipelines for performing more general computing tasks, for example in accordance with compute shader API's such as OpenCL and Vulkan. In this case, the graphics processor 3 will be used to perform more general data processing tasks, that may not specifically relate to the generation of graphics data for a graphics output (e.g. for display).

Figure 3:
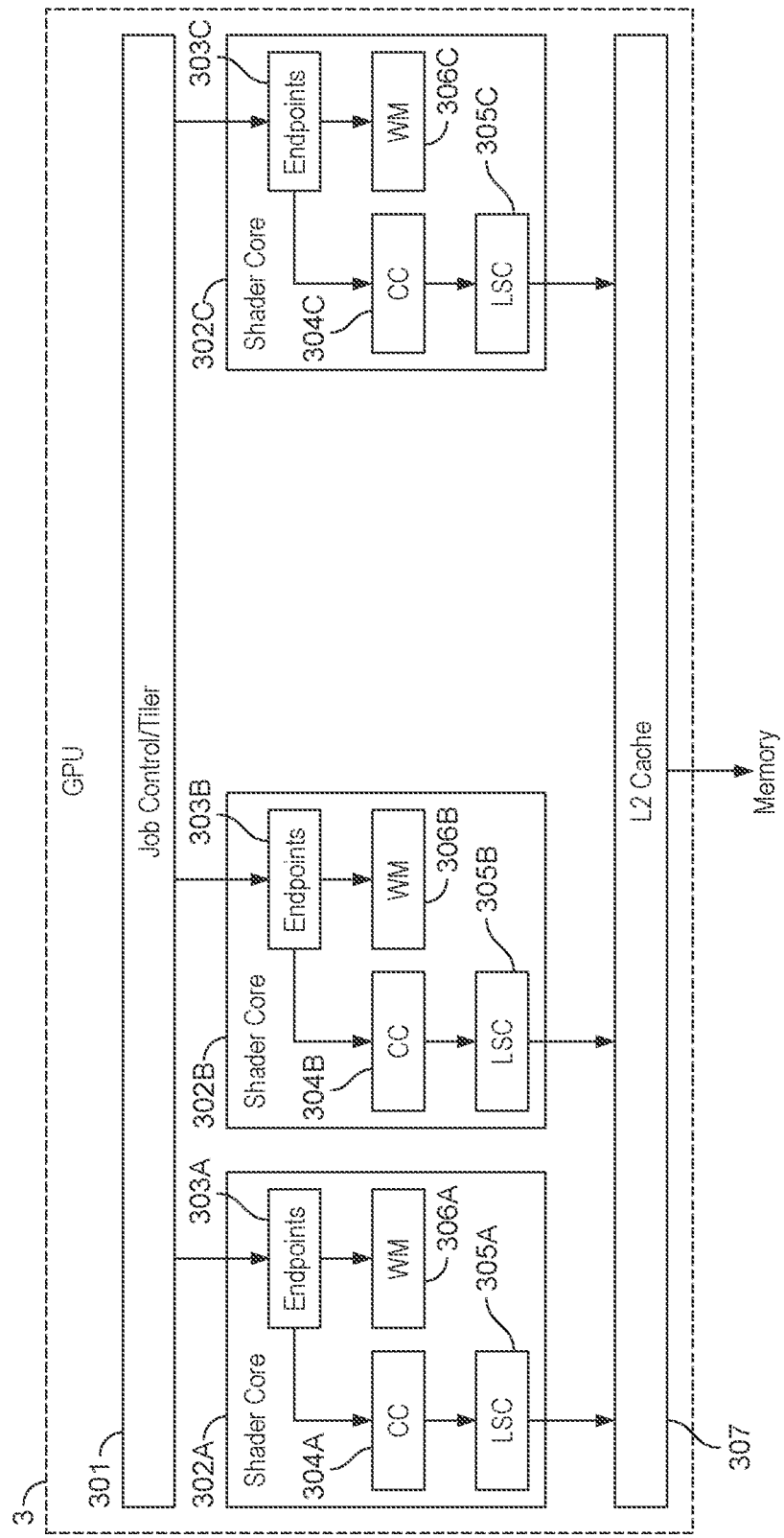
FIG. 3 illustrates a graphics processor in accordance with embodiments of the technology described herein.

FIG. 3 shows the graphics processor 3 of the present embodiment in more detail. FIG. 3 shows the main elements of the graphics processor 3 that are relevant to the operation of the present embodiment. As will be appreciated by those skilled in the art there may be other elements of the graphics processor 3 that are not illustrated in FIG. 3.

As shown in FIG. 3, to facilitate shader operation, the graphics processor 3 of the present embodiment includes a (task) management circuit in the form of a job manager 301 that can receive tasks (commands and data) from the driver 4, and divide a task given by the driver 4 into subtasks, and distribute the subtasks for execution to a set of processing cores (shader cores) 302A, 302B, 302C of the graphics processor 3. FIG. 3 shows three shader cores 302A, 320B, 302C, but it will be appreciated that other numbers of shader cores are possible, such as one, two, four, eight, sixteen, thirty-two, etc.

As shown in FIG. 3, each shader core 302A, 302B, 302C includes an endpoint 303A, 303B, 303C that can send requests to warp manager ("WM") 306A, 306B, 306C to create a group of execution threads (which may be referred to as a "warp") for execution by the execution engine of the processing core. In the present embodiment, the threads of one group ("warp") of execution threads are executed in lockstep, one instruction at a time, by the execution engine of the processing core.

As shown in FIG. 3, the graphics processor 3 of the present embodiment further includes a cache system that is operable to transfer data from the memory 5 to the processing cores (shader cores) 302A, 302B, 302C, and conversely to transfer data produced by the processing cores 302A, 302B, 302C to the memory 5.

The cache system shown in FIG. 3 is illustrated as comprising two cache levels: a shared L2 cache 307 that is closer to the memory 5, and a respective L1 cache (load store cache ("LSC")) 305A, 305B, 305C associated with each shader core 302A, 302B, 302C of the graphics processor 3 (and from which the data is provided to the respective shader cores 302A, 302B, 302C). Other caches and cache levels would be possible.

As discussed above, the graphics processor 3 of the present embodiment is a tile-based graphics processor and can thus produce tiles of a render output data array, such as an output frame to be generated. An advantage of such tile-based rendering is that graphics processing commands (primitives) that do not apply to a given tile do not have to be processed for that tile, and therefore can be ignored when the tile is processed. This allows the overall amount of graphics processing necessary for a given render output to be reduced. In a tile-based rendering system, it is accordingly usually desirable to be able to identify and know those commands (primitives) that actually apply to a given rendering tile so as to, e.g., avoid unnecessarily processing commands and primitives that do not actually apply to a tile.

In order to facilitate this, in the present embodiment, the job manager 301 can operate as a tiler unit to prepare lists of the primitives to be processed for different regions of the render output. These "primitive lists" (which can also be referred to as a "tile list" or "polygon list") identify (e.g. by reference to a primitive indicator) the primitives to be processed for the region in question. The regions of the render output that primitive lists can be prepared for can correspond e.g. to single rendering tiles, or to sets of plural rendering tiles.

As part of this processing, the job manager 301 may distribute vertex processing tasks to the set of shader cores 302A, 302B, 302C to generate processed vertex data that the tiler unit 301 uses to prepare primitive lists. Then, once the primitive lists have been prepared for the render output regions, the job manager 301 may cause the shader cores 302A, 302B, 302C to use the prepared primitives lists when performing fragment processing operations.

Similarly, in the case of "compute" processing, the job manager 301 may distribute compute processing tasks to the set of shader cores 302A, 302B, 302C appropriately.

Thus, the job manager 301 can distribute processing tasks (such as vertex processing tasks, fragment processing tasks, and compute processing tasks) to the shader cores 302A, 302B, 302C for execution, and in response to which the shader cores 302A, 302B, 302C can perform the required processing e.g. by executing a shader program.

Figure 4:
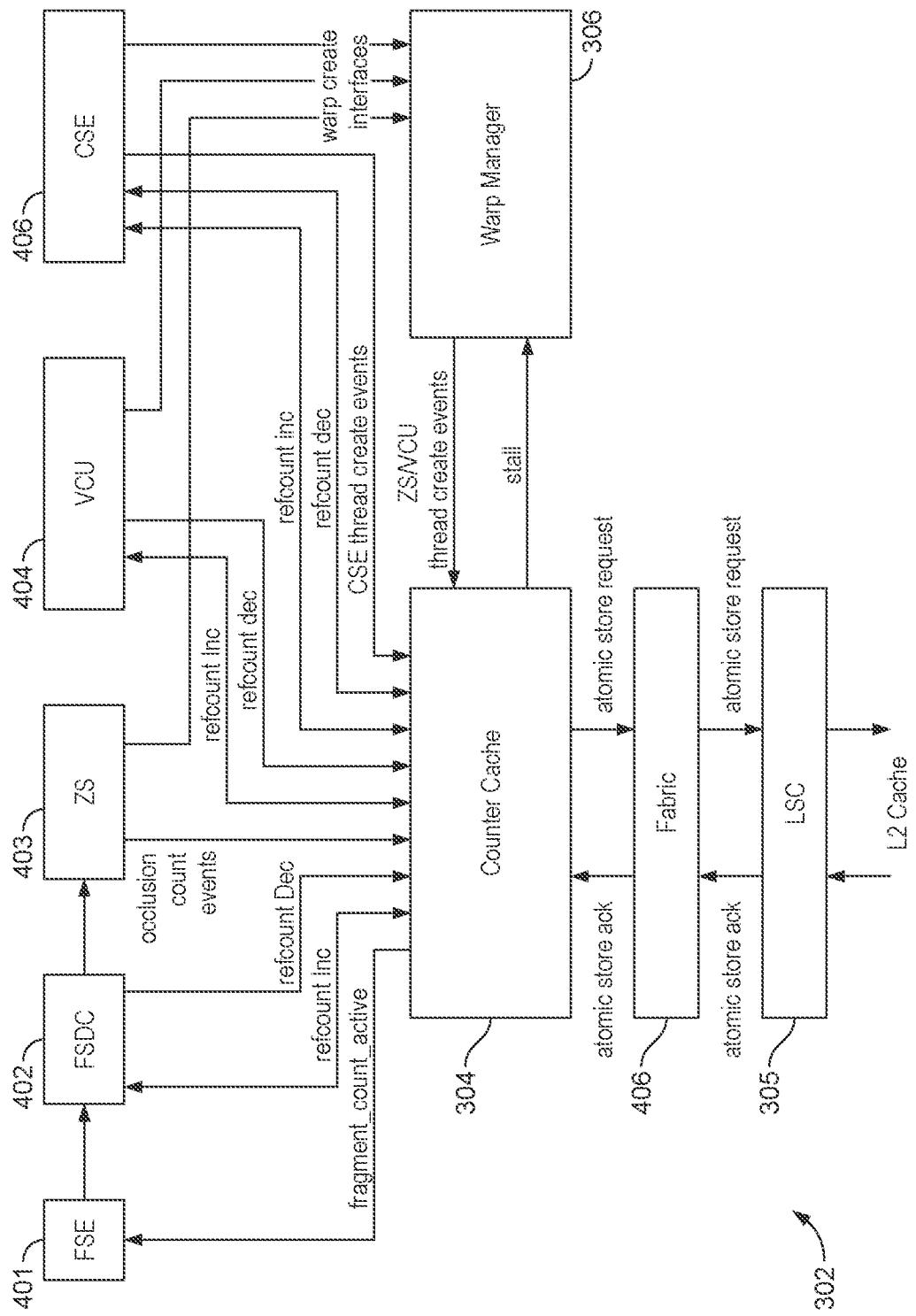
FIG. 4 illustrates a programmable execution unit of a graphics processor in accordance with embodiments of the technology described herein.

FIG. 4 schematically illustrates this operation of a shader core 302 in more detail. It will be appreciated that each shader core 302A, 302B, 302C may be operable as illustrated in FIG. 4.

A shown in FIG. 4, in the case of compute processing, Compute Shader Endpoint ("CSE") 406 may receive compute processing tasks from the job manager 301, and in response, issue a request to warp manager 306 for the creation of a group of execution threads (a "warp") for execution. Similarly, in the case of vertex processing, Vertex Control Unit ("VCU") 404 may receive vertex processing tasks from the job manager 301, and in response, issue a request to warp manager 306 for the creation of a group of execution threads (a "warp") for execution.

In the case of fragment processing, Fragment Shader Endpoint ("FSE") 401 may receive fragment processing tasks from job manager 301, access Fragment Shared Descriptor Cache ("FSDC") 402, and cause appropriate Z (depth) and stencil testing to be performed by Z and Stencil Unit ("ZS") 403, before warp manager 306 causes a group of execution threads (a "warp") to be appropriately executed by the processing core.

It can often be the case that such processing tasks will involve the use of counters. For example, a counter (or counters) may be used to keep track of a number of threads sent for execution by a particular endpoint. In the case of the Z (depth) and stencil testing process, for example, a counter (or counters) may be used for occlusion query purposes. Other uses of a counter are possible.

While it would be possible to specify a separate counter for each possible such counting task, the inventors have recognised that it may normally be the case that not all such counters will be required to be in use at the same time.

As illustrated in FIGS. 3 and 4, in embodiments of the technology described herein, each shader core 302, 302A, 302B, 302C includes a set of local counters (registers) arranged in a respective counter cache ("CC") 304, 304A, 304B, 304C, with the counters of a counter cache being "dynamically" allocatable in use to particular counting tasks in a "cache-like" arrangement. This can then facilitate, for example, a reduction in the number and/or size of counters that would otherwise be required. Moreover, this arrangement can conveniently allow different shader cores and processing tasks or contexts to contribute to the same count.

Figure 5:
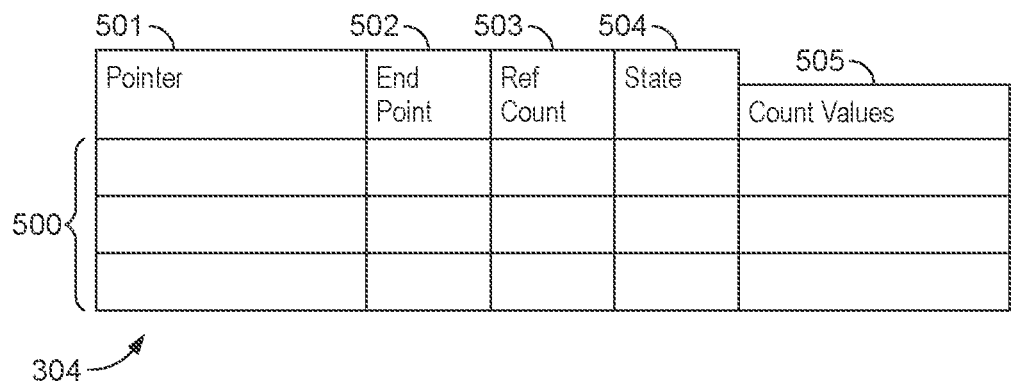
FIG. 5 illustrates a cache-like pool of one or more entries in accordance with embodiments of the technology described herein.
Figure 6:
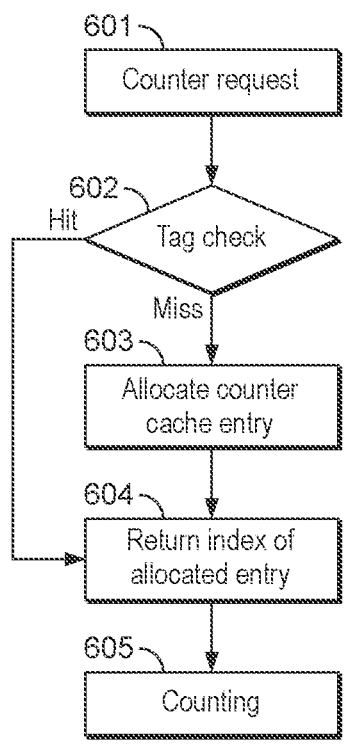
FIG. 6 is a flow chart illustrating a counter allocation process in accordance with embodiments of the technology described herein.

FIGS. 5 and 6 schematically illustrate the arrangement of a counter cache 304 of a shader core 302, according to the present embodiment. It will be appreciated that each shader core 302A, 302B, 302C may maintain a respective counter cache 304 as illustrated in FIGS. 5 and 6.

As illustrated in FIG. 5, the counter cache 304 of the present embodiment is arranged as a "cache-like" data structure comprising a pool of entries 500 that "cache" count values 505. That is, the counter cache 304 is arranged to operate in an analogous manner to a conventional data cache (such as load store cache ("LSC") 305A, 305B, 305C), but rather than each cache entry (e.g. cache line) caching data fetched from memory 5 (as would be the case for a conventional data cache), each entry of the counter cache 304 is associated with (includes) a respective counter 505. FIG. 5 illustrates a counter cache 304 that includes three counters 505, but it will be appreciated that other number of counters (entries) would be possible.

As illustrated in FIG. 5, each entry in the counter cache 304 is tagged (identified) by a pointer 501 that identifies a location in memory 5 where an overall counting result value is to be stored. Each entry can further include a set of state information 504, such as flags, indicating a status of the entry, e.g. whether the entry is valid or not, is free or not, etc., reference count information 503, and endpoint (shader type) information 502, which will be described below.

FIG. 6 illustrates the basic operation of the counter cache 304 according to the present embodiment. As shown in FIG. 6, at step 601, in response to a request requiring a counter from job manager 301, an endpoint 303 may issue a request for a counter to the counter cache 304. The counter request 601 indicates an address in memory 5 where a counting result should be stored.

In response to a counter request that indicates a memory address, the counter cache 304 performs a "tag-checking" step 602, in which it is determined whether or not the pool of entries 500 already includes a valid entry having a pointer (tag) 501 that matches the memory address indicated by the counter request.

If it is determined that the pool 500 already includes a valid and matching entry (i.e. if there is a "cache hit"), an index indicating the (already-allocated) entry is returned to the endpoint 303 at step 604. Required counting operations can then be performed at step 605 by sending counting requests to the counter cache 304 that indicate the index of the entry corresponding to the counter 505 that should be used, and the value to be counted. In response to such a counting request, the counter cache 304 adds the indicated value to the counter 505 corresponding to the indicated index.

On the other hand, if at step 602 it is determined that the pool 500 does not include a valid and matching entry (i.e. if there is a "cache miss"), an entry of the pool 500 (and corresponding counter 505) may be allocated at step 603. Step 603 may involve allocating an entry that is indicated by state information 504 as being free or invalid, or evicting an entry to memory 5 and allocating the entry that was evicted. In this case, the pointer (tag) 501 for the newly allocated entry will be updated to correspond to the memory address indicated in the counter request. The count value 505 for the newly allocated entry may also be reset to zero. Furthermore, the end point (shader type) information 502 may be updated to indicate the requesting endpoint (shader type), and the state information 504 may be updated appropriately, e.g. to indicate that the newly allocated entry is valid and/or not free.

Once an entry has been allocated, an index indicating the allocated entry is returned at step 604. Required counting operations can then be performed at step 605 by sending counting requests to the counter cache 304 that indicate the index of the entry corresponding to the counter 505 that should be used, and the value to be counted. In response to such a counting request, the counter cache 304 adds the indicated value to the counter 505 corresponding to the indicated index.

As discussed above, it can be the case that multiple different processing tasks or contexts should contribute to the same count. For example, in the case of tile-based graphics processing, it can be the case that the same draw call will touch multiple different rendering tiles, such that contributions to a count value for the draw call may originate from the processing of multiple different rendering tiles.

In the present embodiment, to facilitate this, a reference counting arrangement is used. Thus, as shown in FIG. 5, each entry of the counter cache 304 includes a reference count 503. A reference count 503 may initially be zero, indicating that no tasks or contexts are associated with the corresponding counter 505. Then, when (at step 603) an entry of the counter cache 304 is newly allocated, the reference count 503 may be set to one, to indicate that a task or context is now using the associated counter 505. Correspondingly, when (at step 602) it is determined that the pool 500 includes a valid and matching entry (i.e. when there is a "cache hit"), the reference count 503 for the matching entry may be incremented, to indicate that a (another) task or context is using the associated counter 505. A reference count 503 is then decremented when a task or context that was using the corresponding counter completes.

Returning to FIG. 4, CSE 406 may, in response to a request for compute processing for a particular task or context, issue a request ("refcount inc") for a counter to the counter cache 304 that indicates an address in memory 5 where a counting result is to be stored. In response to the counter request, counter cache 304 returns to CSE 406 an index that indicates an entry of the pool 500 corresponding to a counter 505 that should be used. Counter cache 304 furthermore increments the reference count 503 of that entry.

Then, when CSE 406 issues a request to warp manager 306 for creating a group of execution threads (a "warp"), CSE 406 also issues a counting request ("CSE thread create events") to the counter cache 304 that indicates the number of threads to be created, and the index returned by the counter cache 304. In response to the counting request, counter cache 304 increments the counter 505 of the entry corresponding to the index by the number of threads indicated by the counting request.

When a last group of execution threads ("warp") has been issued for the task or context in question, CSE 406 issues a signal ("refcount dec") to the counter cache 304 that indicates that use of the counter 505 for the task or context in question is complete. In response to the signal, counter cache 304 decrements the reference count 503 of the corresponding entry, and returns a signal to CSE 406 indicating that the reference count 503 has been decremented.

In the case of vertex processing, as illustrated in FIG. 4, VCU 404 may, in response to a request for vertex processing, issue a request ("refcount inc") for a counter to the counter cache 304 that indicates an address in memory 5 where a counting result is to be stored. In response to the counter request, counter cache 304 returns to VCU 404 an index that indicates an entry of the pool 500 corresponding to a counter 505 that should be used. Counter cache 304 furthermore increments the reference count 503 of that entry.

Then, when VCU 404 issues a request to warp manager 306 for creating a group of execution threads (a "warp"), the request indicates the index returned by the counter cache 304. Then, when warp manager 306 issues a group of execution threads (a "warp") for execution, warp manager 306 also issues a counting request ("VCU thread create events") to the counter cache 304 that indicates the number of threads created, and the index. In response to the counting request, counter cache 304 increments the counter 505 of the entry corresponding to the index by the number of threads indicated by the counting request.

When a last group of execution threads ("warp") has been issued for the task or context in question, VCU 404 issues a signal ("refcount dec") to the counter cache 304 that indicates that use of the counter 505 for the task or context in question is complete. In response to the signal, counter cache 304 decrements the reference count 503 of the corresponding entry. Counter cache 304 may then return a signal to VCU 404 indicating that the reference count 503 has been decremented.

In the case of fragment processing, as illustrated in FIG. 4, FSE 401 may, in response to a request for fragment processing, cause FSDC 402 to issue a request ("refcount inc") for a counter to the counter cache 304 that indicates an address in memory 5 where a counting result is to be stored. In response to the counter request, counter cache 304 returns to FSDC 402 an index that indicates an entry of the pool 500 corresponding to a counter 505 that should be used. Counter cache 304 furthermore increments the reference count 503 of that entry.

Then, when ZS 403 issues a request to warp manager 306 for creating a group of execution threads (a "warp"), the request indicates the index returned by the counter cache 304. Then, when warp manager 306 issues a group of execution threads (a "warp") for execution, warp manager 306 also issues a counting request ("ZS thread create events") to the counter cache 304 that indicates the number of threads created, and the index. In response to the counting request, counter cache 304 increments the counter 505 of the entry corresponding to the index by the number of threads indicated by the counting request.

When a last group of execution threads ("warp") has been issued for the task or context in question, FSDC 402 issues a signal ("refcount dec") to the counter cache 304 that indicates that use of the counter 505 for the task or context in question is complete. In response to the signal, counter cache 304 decrements the reference count 503 of the corresponding entry. Counter cache 304 may then return a signal to FSDC 402 indicating that the reference count 503 has been decremented.

As mentioned above, fragment processing may also require a counter for occlusion query purposes. Thus, as illustrated in FIG. 4, FSE 401 may, in response to a request for fragment processing, cause FSDC 402 to issue a request ("refcount inc") for a (another) counter to the counter cache 304 that indicates an address in memory 5 where a counting result is to be stored. In response to the counter request, counter cache 304 returns to FSDC 402 an index that indicates an entry of the pool 500 corresponding to a counter 505 that should be used. Counter cache 304 furthermore increments the reference count 503 of that entry.

ZS 403 can then issue counting requests ("occlusion count events") to the counter cache 304 that indicate a number of occlusions, and the index. In response to such a counting request, counter cache 304 increments the counter 505 of the entry corresponding to the index by the number of occlusions indicated by the counting request.

When a last group of execution threads ("warp") has been issued for the task or context in question, FSDC 402 issues a signal ("refcount dec") to the counter cache 304 that indicates that use of the counter 505 for the task or context in question is complete. In response to the signal, counter cache 304 decrements the reference count 503 of the corresponding entry. Counter cache 304 may then return a signal to FSDC 402 indicating that the reference count 503 has been decremented.

A reference count 503 returning to zero will indicate that the associated counter 505 is no longer in use by any task or context. In the present embodiment, a reference count 503 returning to zero therefore triggers output of the associated counter value 505 to memory 5. In the present embodiment, this output operation is done in an analogous manner to a conventional data cache eviction operation, but rather than the "eviction" operation involving data cached by a cache entry (e.g. cache line) being written to memory 5 at a memory location indicated by the tag of the cache entry (e.g. cache line) (as would be the case for a conventional data cache), a count value 505 "cached" by an entry of the pool 500 is added to a count value stored in memory 5 at the memory location indicated by the pointer (tag) 501 of the entry. Then, once an entry has been "evicted" to memory 5 in this manner, the state information 504 of the entry is updated to indicate that the entry is no longer valid. The count value 505 may also be reset to zero.

In the present embodiment, to facilitate multiple processing cores contributing to the same count value in memory, and to avoid the possibility of a race caused by different processing cores attempting to output a count value to the same memory location at the same time, the addition operation is done using an atomic addition operation. An atomic addition operation is an operation sequence that reads a memory location, performs an addition operation between the read memory value and the output counter value, and then writes the result of the addition operation back to the same memory location. The sequence of operations is carried out so that to every observer, it looks as if the sequence has either not been performed at all, or been performed in its entirety. It is executed as one indivisible unit, hence the name "atomic".

Returning to FIG. 4, if decrementing a reference count 503 causes the reference count 503 to return to zero, the counter cache 304 issues a request ("atomic store request") to LSC 305 via fabric interface 406 to atomically add the counter value 505 to the count value currently stored in memory 5 at the memory location indicated by the pointer (tag) 501, and store the result in memory 5 at the indicated memory location. In response to the request, the cache system effectively takes ownership of the memory location in question so as to prevent other processing cores accessing that memory location at the same time, causes the addition operation to be performed, and then returns a signal ("atomic store ack"). In response to the returned signal from fabric interface 406, the counter cache 304 deallocates the entry by updating the state information 504 to indicate that the entry is now invalid.

Once a count value has been "evicted" to memory 5 in this manner (and the corresponding counter cache entry has been deallocated), the counter cache 304 may signal to the requesting endpoint that the "eviction" operation has been completed (and the entry has been deallocated), e.g. so as to indicate that the count value in memory 5 is now safe to read (is valid).

The counter cache 304 could explicitly signal that a count value has been "evicted" to memory 5 (and the corresponding entry deallocated). Thus, the counter cache 304 could signal that a reference count 503 has been decremented, and separately signal that the "eviction" operation has completed. However, in the present embodiment, in the case where a reference count 503 returns to zero, the signal to CSE 406 indicating that the reference count 503 has been decremented is delayed until the counter cache 304 has received the "eviction" response ("atomic store ack") from fabric interface 406. Counter cache 304 can thereby issue only a single signal to CSE 406 that indicates that the reference count 503 has been decremented and that a resulting "eviction" operation has completed.

In the case of fragment processing, counter cache 304 can simply wait until all fragment processing has been completed before signalling that count values in memory 5 are safe to read (are valid). To do this, in the present embodiment, counter cache 304 signals a flag ("fragment count_active") to FSE 401 that indicates whether or not the counter cache 304 currently includes any active (valid) entries that are indicated by end point (shader type) information 502 as corresponding to fragment processing. When the flag indicates that there are no active fragment counters in the counter cache 304, it can be assumed that all memory operations for all fragment tasks or contexts have completed.

In the present embodiment, as well as the output "eviction" of a counter value 505 being triggered by a reference count 503 returning to zero, output of a counter value 505 can also be triggered in order to avoid the possibility of the counter overflowing. To do this an output "flushing" operation can be triggered by a count value 505 reaching a threshold value.

This "flushing" operation can allow smaller counters to be used than would otherwise be required. For example, in the present embodiment, count values are stored as 64-bit values in memory 5, but rather than each local counter comprising a 64-bit register, each local counter comprises a 20-bit register.

As with an "eviction" operation, a "flushing" operation involves an atomic addition operation. Thus, if a counter value 505 reaches a threshold value, the counter cache 304 issues a request ("atomic store request") to LSC 305 via fabric interface 406 to atomically add the counter value 505 to the count value currently stored in memory 5 at the memory location indicated by the pointer (tag) 501, and store the result in memory 5 at the indicated memory location. The counter cache 304 also resets the count value 505 to zero. In response to the request, the cache system effectively takes ownership of the memory location in question so as to prevent other processing cores accessing that memory location at the same time, causes the addition operation to be performed, and then returns a signal ("atomic store ack").

In contrast with "eviction" operation, following a "flushing" operation a counter cache entry remains valid, and so is not deallocated. Furthermore, a response to an endpoint indicating that a "flushing" operation has been completed is not required.

To allow for the possibility of it not being possible to immediately perform such a "flushing" operation, e.g. where the fabric interface 406 is busy, the counter cache 304 can signal ("stall") to warp manager 306 to stall issuing warps for execution, e.g. until the count value is output.

Figure 7:
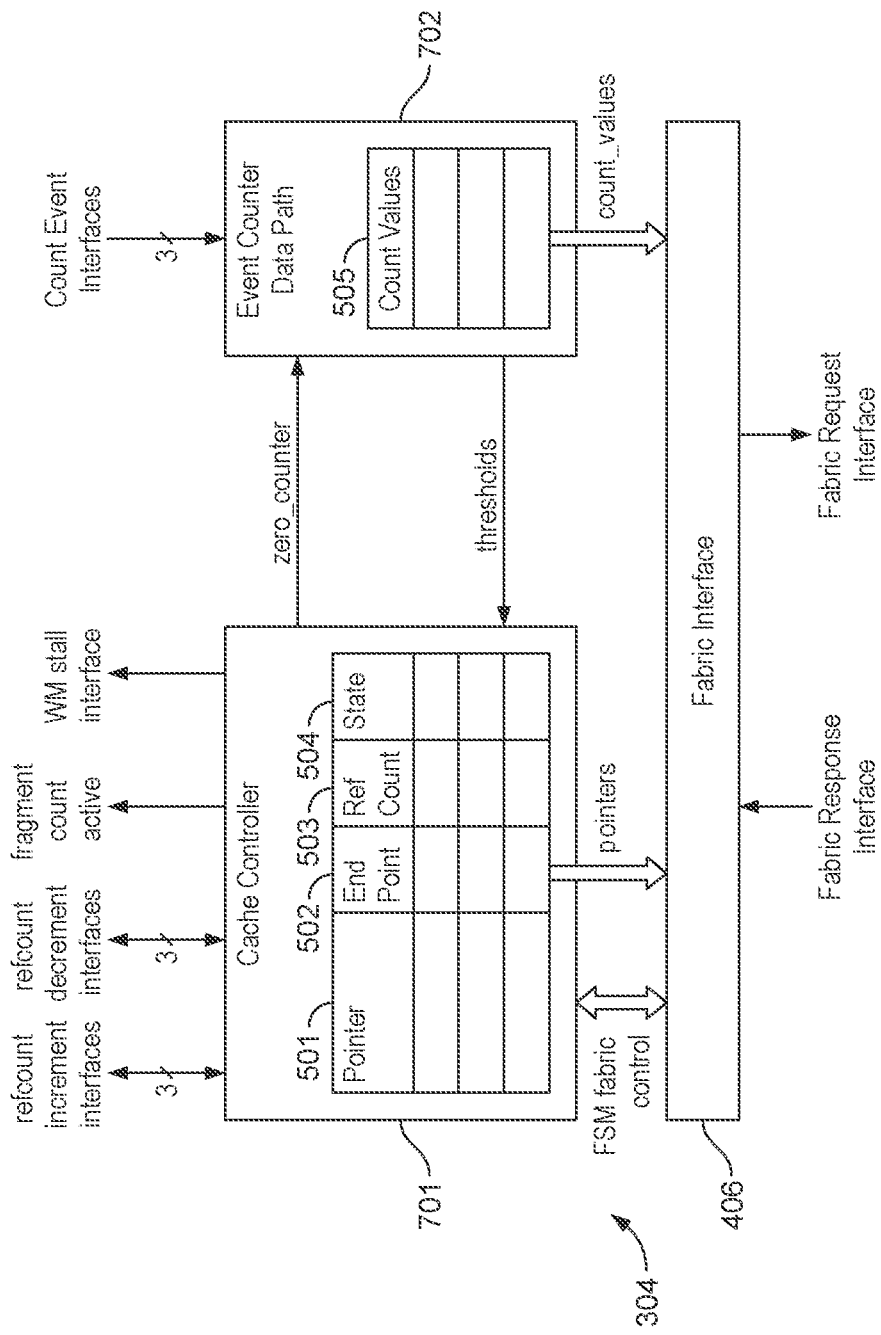
FIG. 7 illustrates a control circuit of a programmable execution unit of a graphics processor in accordance with embodiments of the technology described herein.

FIG. 7 shows schematically the counter cache 304 in more detail. As shown in FIG. 7, the counter cache 304 of the present embodiment is split into a cache controller module 701 and an event counter data path module 702. Pointers (tags) 501, end point (shader type) information 502, reference counts 503 and state information 504 are stored in the cache controller module 701, whereas counter values 505 are stored separately in the data path module 702. The cache controller module 701 can signal ("zero_counter") to the data path module 702 to cause a count value 505 to be zeroed (reset).

As shown in FIG. 7, the data path module 702 can signal ("thresholds") to the cache controller module 701 to indicate that a count value 505 has reached a threshold value. In response to the data path module 702 signalling that a count value 505 has reached a threshold value for flushing, the cache controller module 701 triggers the "flushing" operation. The flushing threshold value can be set appropriately to minimise the risk of the maximum value of a counter being reached. For example, the flushing threshold may correspond to the most significant bit of a counter transitioning from zero to one.

In the present embodiment, the data path module 702 also signals to the cache controller module 701 when a count value 505 reaches a stalling threshold value that is higher than the flushing threshold value. In response to the data path module 702 signalling that a count value 505 has reached the stalling threshold value, the cache controller module 701 triggers a "stalling" operation.

In the present embodiment, the data path module 702 also signals to the cache controller module 701 when a count value 505 reaches a stalling threshold value that is lower than the flushing threshold value. In response to the data path module 702 signalling that a count value 505 has reached this lower stalling threshold value, the cache controller module 701 will trigger a "stalling" operation if a "flushing" operation for the corresponding entry has been triggered but has yet to complete. This can then avoid the possibility of having multiple outstanding flush transactions.

Other arrangements would be possible.

Figure 8:
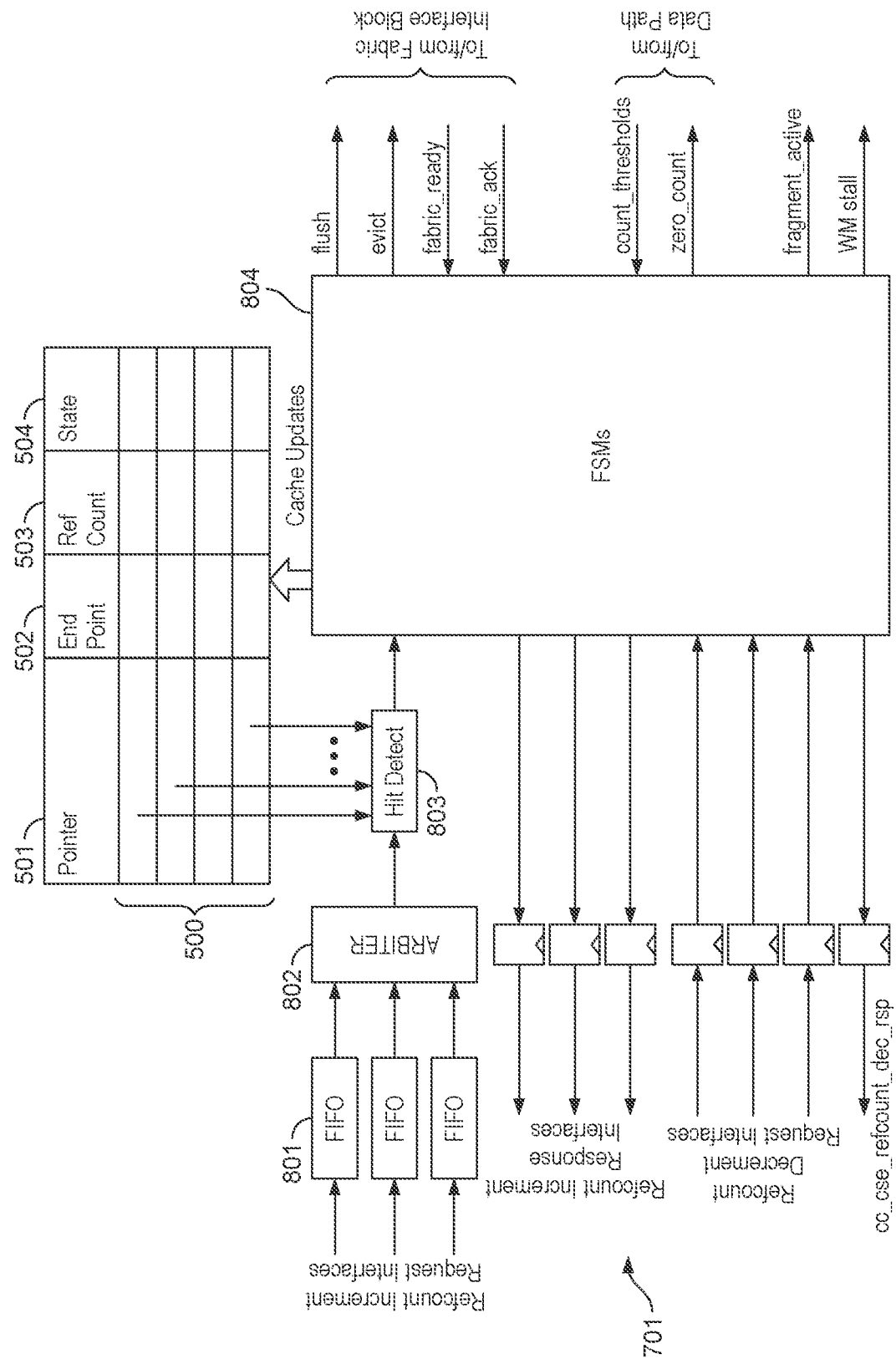
FIG. 8 illustrates a control element of the control circuit illustrated in FIG. 7 in accordance with embodiments of the technology described herein.

FIG. 8 shows schematically the cache controller module 701 of the present embodiment in more detail. As shown in FIG. 8, the cache controller module 701 includes finite state machines ("FSMs") 804 that maintain the pool 500 of counter cache entries. The cache controller module 701 also includes a set of FIFOs 801 that can receive and buffer counter requests. In the present embodiment, the cache controller module 701 includes three FIFOs: a FIFO that receives counter requests from CSE 406, a FIFO that receives counter requests from VCU 404, and a FIFO that receives counter requests from FSDC 402.

As shown in FIG. 8, the cache controller module 701 further includes an arbiter circuit 802 that selects, from the FIFOs 801, the next counter request to be processed, and passes the selected counter request to hit detect circuit 803. In response, hit detect circuit 803 performs "tag-checking" (i.e. step 602 of FIG. 6) to determine if the request matches an entry of the pool 500 maintained by FSMs 804.

Figure 9:
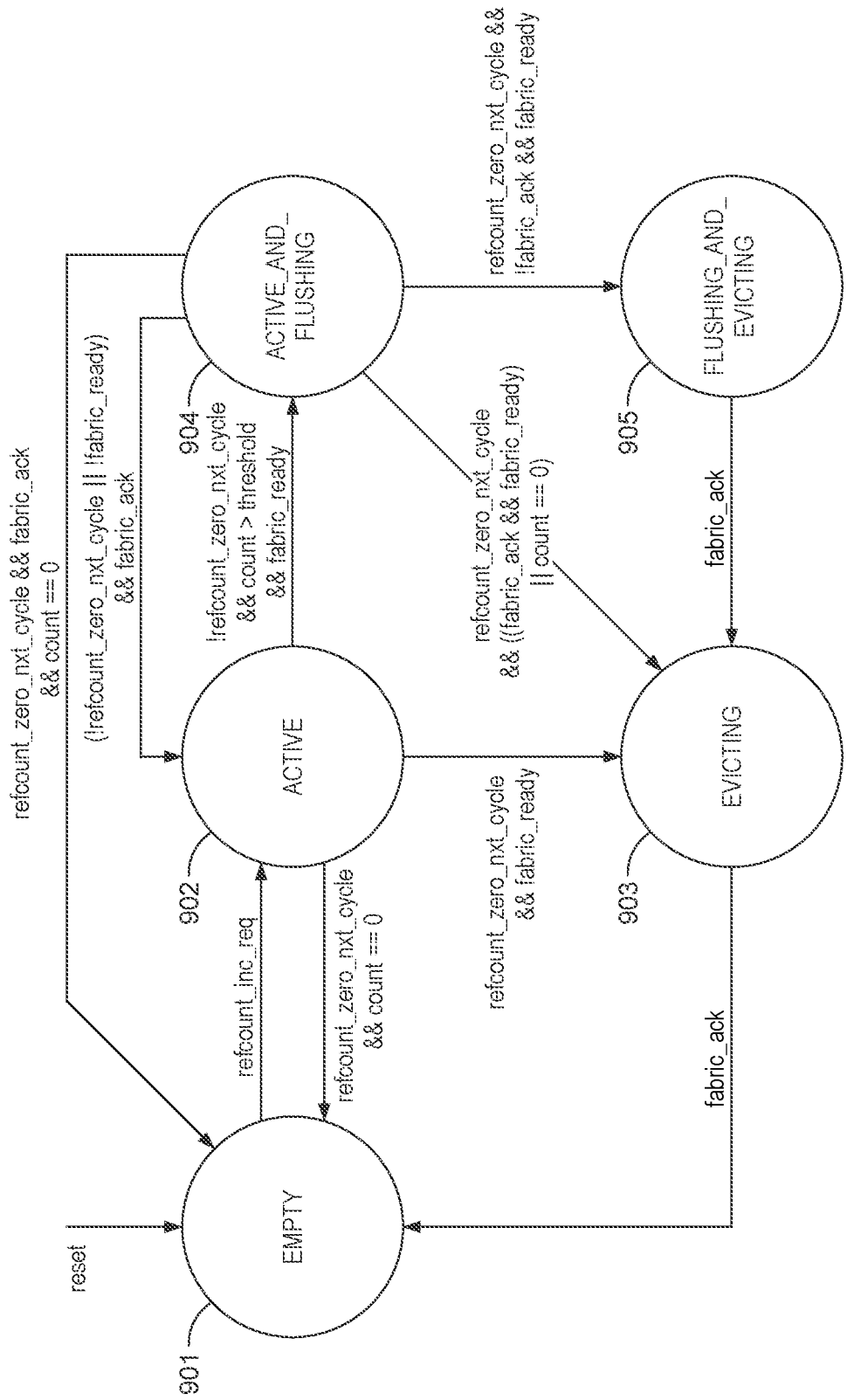
FIG. 9 illustrates a finite state machine in accordance with embodiments of the technology described herein.

FIG. 9 illustrates possible states that the state information 504 can indicate, according to the present embodiment. As shown in FIG. 9, in the present embodiment, an entry of the pool 500 can be indicated by state information 504 as being "empty" 901, "active" 902, "evicting" 903, "active and flushing" 904, or "flushing and evicting" 905.

A pool entry will initially (following a reset) be in the "empty" 901 state, indicating that the entry (and corresponding counter) is not currently allocated (is invalid). A counter 505 of an entry that is indicated as being in the "empty" 901 state will not be able to accept any counting requests.

Then, when an entry is newly allocated (at step 603 in FIG. 6), its state information 504 is updated to be in the "active" 902 state, indicating that the entry is allocated (is valid). A counter 505 of an entry that is indicated as being in the "active" 902 state will then be able to accept counting requests.

When the reference count 503 of an active entry returns to zero, the count value 505 of the entry is not zero, and the fabric interface 406 is ready for an "eviction" operation, its state information 504 is updated from the "active" 902 state to the "evicting" 903 state. A counter 505 of an entry that is indicated as being in the "evicting" 903 state will not be able to accept counting requests. If a request for a counter that matches an "evicting" entry is received, a new entry allocation is triggered. An entry in the "evicting" 903 state is thus considered to be invalid.

When an eviction operation has been completed (as indicated by the fabric interface 406), state information 504 is updated from the "evicting" 903 state to return to the "empty" 901 state.

If the reference count 503 of an active entry returns to zero, and the count value 505 of the entry is zero, its state information 504 may simply be updated from the "active" 902 state to return to the "empty" 901 state without triggering a "eviction" operation.

If the reference count 503 of an active entry passes a threshold, and the fabric interface 406 is ready for a "flushing" operation, its state information 504 is updated from the "active" 902 state to the "active and flushing" 904 state. A counter 505 of an entry that is indicated as being in the "active and flushing" 904 state can accept counting requests, and is considered to be valid.

When a flushing operation has been completed (as indicated by the fabric interface 406), state information 504 may be updated from the "active and flushing" 904 state to return to the "active" 902 state.

If, however, a reference count 503 of an entry in the "active and flushing" 904 state returns to zero, the count value 505 of the entry is not zero, and the fabric interface 406 is ready for an "eviction" operation, state information 504 for the entry is updated from the "active and flushing" 904 state to the "flushing and evicting state" 905 state. A counter 505 of an entry that is indicated as being in the "flushing and evicting state" 905 state will not be able to accept counting requests. If a request for a counter that matches a "flushing and evicting" entry is received, a new entry allocation is triggered. An entry in the "flushing and evicting state" 905 state is thus considered to be invalid.

When a flushing operation has been completed (as indicated by the fabric interface 406), state information 504 may be updated from the "flushing and evicting state" 905 state to the "evicting" 903 state.

As shown in FIG. 9, it is also possible for state information 504 to be updated from "active and flushing" 904 to "active" 902, when a reference count 503 returns to zero and the interface 406 is not ready for an "eviction" operation.

As shown in FIG. 9, it is also possible for state information 504 to be updated from "active and flushing" 904 to "evicting" 903 or "empty" 901, when a reference count 503 returns to zero but the count value 505 is zero.

It will be appreciated from the above that the technology described herein, in its embodiments at least, provides arrangements in which the number and/or size of counters required by a data processor can be reduced. This is achieved, in the embodiments of the technology described herein at least, by allocating counters using a "cache-like" data structure.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A data processor comprising:
a set of one or more counters that can be used by plural different requesters; and
a control circuit configured to:
maintain a pool of one or more entries, wherein each entry of the pool is associated with a respective counter of the set of one or more counters, and includes an identifier associated with the respective counter, and requester-identifying information that can identify a requester of the plural different requesters that requested the respective counter; and to:
in response to a requester of the plural different requesters requesting a counter of the set of one or more counters:
determine whether the pool of one or more entries includes an entry that includes an identifier that matches the request for a counter; and
when it is not determined that the pool of one or more entries includes an entry that includes an identifier that matches the request for a counter, allocate an entry of the pool of one or more entries, and update the requester-identifying information of the allocated entry to identify the requester of the plural different requesters that requested the counter.

2. The data processor of claim 1, wherein each entry of the pool includes state information indicating whether or not the respective entry is valid; and the control circuit is configured to, in response to the request for a counter:
determine whether the pool of one or more entries includes an entry that includes: an identifier that matches the request for a counter, and state information that indicates that the entry is valid; and
allocate an entry of the pool of one or more entries when it is not determined that the pool of one or more entries includes an entry that includes: an identifier that matches the request for a counter, and state information that indicates that the entry is valid.

3. The data processor of claim 1, wherein the control circuit is configured to, in response to the request for a counter:
return an indication of an entry of the pool that includes an identifier that matches the request for a counter.

4. The data processor of claim 1, wherein the control circuit is configured to:
in response to a request for counting, the request for counting including an indication of an entry of the pool:
cause the requested counting to be performed using the counter that the indicated entry is associated with.

5. The data processor of claim 1, wherein the identifier of each entry of the pool can indicate a memory address associated with the respective counter, and the request for a counter indicates a memory address; and
the control circuit is configured to:
determine whether the pool of one or more entries includes an entry that includes an identifier that matches the request for a counter by determining whether the pool of one or more entries includes an entry that includes an identifier that indicates the memory address indicated by the request for a counter.

6. The data processor of claim 5, wherein each entry of the pool includes reference information indicating whether or not the respective counter is in use; and the control circuit is configured to:
in response to the reference information of an entry indicating that the respective counter is no longer in use:
output a count value of the counter to the memory address indicated by the identifier of the entry.

7. The data processor of claim 1, wherein the control circuit is configured to, in response to a count value of a counter of the set of one or more counters reaching a threshold value:
output the count value of the counter to memory, wherein a bit width of the count value stored in memory is greater than a bit width of the counter.

8. The data processor of claim 1, wherein the control circuit is configured to output of a count value of a counter to a memory address by atomically adding the count value to a count value stored at the memory address.

9. The data processor of claim 1, wherein the data processor is configured to use the requester-identifying information to determine whether counting for a requester of the plural different requesters has been completed.

10. A method of operating a data processor that comprises a set of one or more counters that can be used by plural different requesters, the method comprising:
maintaining a pool of one or more entries, wherein each entry in the pool is associated with a respective counter of the set of one or more counters, and includes an identifier associated with the respective counter, and requester-identifying information that can identify a requester of the plural different requesters that requested the respective counter; and in response to a requester of the plural different requesters requesting a counter of the set of one or more counters:

determining whether the pool of one or more entries includes an entry that includes an identifier that matches the request for a counter; and when it is not determined that the pool of one or more entries includes an entry that includes an identifier that matches the request for a counter, allocating an entry of the pool of one or more entries, and updating the requester-identifying information of the allocated entry to identify the requester of the plural different requesters that requested the counter.

11. The method of claim 10, wherein each entry of the pool includes state information indicating whether or not the respective entry is valid; and the method comprises, in response to the request for a counter:

determining whether the pool of one or more entries includes an entry that includes: an identifier that matches the request for a counter, and state information that indicates that the entry is valid; and allocating an entry of the pool of one or more entries when it is not determined that the pool of one or more entries includes an entry that includes: an identifier that matches the request for a counter, and state information that indicates that the entry is valid.

12. The method of claim 11, comprising in response to the request for a counter:

returning an indication of an entry of the pool that includes an identifier that matches the request for a counter.

13. The method of claim 10, comprising in response to a request for counting, the request for counting including an indication of an entry of the pool:

performing the requested counting using the counter that the indicated entry is associated with.

14. The method of claim 10, wherein the identifier of each entry of the pool can indicate a memory address associated with the respective counter, and the request for a counter indicates a memory address; and determining whether the pool of one or more entries includes an entry that includes an identifier that matches the request for a counter is performed by determining whether the pool of one or more entries includes an entry that includes an identifier that indicates the memory address indicated by the request for a counter.

15. The method of claim 10, comprising in response to a count value of a counter of the set of one or more counters reaching a threshold value:

outputting the count value of the counter to memory, wherein a bit width of the count value stored in memory is greater than a bit width of the counter.

16. The method of claim 10, comprising outputting a count value of a counter to a memory address by atomically adding the count value to a count value stored at the memory address.

17. The method of claim 10, comprising using the requester-identifying information to determine whether counting for a requester of the plural different requesters has been completed.

18. A non-transitory computer readable storage medium storing software code which when executing on a processor performs a method of operating a data processor that comprises a set of one or more counters that can be used by plural different requesters;

the method comprising:

maintaining a pool of one or more entries, wherein each entry in the pool is associated with a respective counter of the set of one or more counters, and includes an identifier associated with the respective counter, and requester-identifying information that can identify a requester of the plural different requesters that requested the respective counter; and in response to a requester of the plural different requesters requesting a counter of the set of one or more counters:

determining whether the pool of one or more entries includes an entry that includes an identifier that matches the request for a counter; and when it is not determined that the pool of one or more entries includes an entry that includes an identifier that matches the request for a counter, allocating an entry of the pool of one or more entries, and updating the requester-identifying information of the allocated entry to identify the requester of the plural different requesters that requested the counter.

* * * * *